US007698200B2

(12) United States Patent
Janian

(10) Patent No.: US 7,698,200 B2
(45) Date of Patent: Apr. 13, 2010

(54) METHOD AND SYSTEM FOR EVALUATION OF MARKET CENTERS FOR SECURITY TRADING PERFORMANCE

(75) Inventor: Andrew M. Janian, Clayton, MO (US)

(73) Assignee: Scottrade, Inc., St. Louis, MO (US)

( * ) Notice: Subject to any disclaimer, the term of this patent is extended or adjusted under 35 U.S.C. 154(b) by 872 days.

(21) Appl. No.: 11/382,592

(22) Filed: May 10, 2006

(65) Prior Publication Data

US 2006/0178981 A1    Aug. 10, 2006

(51) Int. Cl.
*G06Q 40/00* (2006.01)
(52) U.S. Cl. ........................................ 705/36 R; 705/37
(58) Field of Classification Search .................. 705/35, 705/12, 36, 36 R, 37
See application file for complete search history.

(56) References Cited

U.S. PATENT DOCUMENTS

2004/0059628 A1 * 3/2004 Parker et al. .................. 705/12

OTHER PUBLICATIONS

Chapman, Peter. Quality control at mother merrill: spending big bucks to obtain best execution. Traders Magazine. Mar. 1, 2000. p. 1-5.*

EliteTrader.com. As viewed by the internet archieves. 2004. p. 1-3.*
Corwin, Shane. Specialist performance and new listing allocations of the NYSE: an empirical analysis. 2003. Journal of Financial Markets p. 27-51.*
Market Systems Inc., 11AC1-5 Web Tools Definitions, Rev. Mar. 23, 2002, pp. 1-4, http://www.marketsystems.com.

* cited by examiner

*Primary Examiner*—Susanna M Diaz
*Assistant Examiner*—Jamie H Swartz
(74) *Attorney, Agent, or Firm*—Thompson Coburn LLP; Kevin Kercher

(57) ABSTRACT

A system and method for creating an index value for evaluating market center execution quality. This can include a summation of at least two derived values selected from: an execution speed of a predetermined order of covered security orders that were executed at a market center; price improvement of a predetermined order of covered security orders that were executed at a market center; percentage of covered security orders that were executed at a market center at a quoted value or a better value; a percentage of covered security orders that were executed at outside the quoted value; and effective spread, which is as twice the difference between the securities execution price and the midpoint of a consolidated best bid or offer at the time of a securities order receipt. The index value can be utilized to compare market center executions provided in public data versus that provided by private data.

30 Claims, 10 Drawing Sheets

| Src-Rpt-Sys Entity Public / SSIC-SSIC Group Executed Away | Detail by MM=All & Orig=All Exec. Speed | Report Date Jan-06 Net / Share | Order Type Market / Marketable Limit Quoted Spread | Size All 1-5 Sizes Realized Spread | Filter / Amount / Order All by Covered Shares Effective Spread | Detail Exchanges Effective / Quoted |
|---|---|---|---|---|---|---|
| | Secs | Cents | Cents | Cents | Cents | % |
| INDUSTRY | 18.1 | -0.17 | 1.87 | -0.72 | 2.21 | 118.08 |
| SELECTED | 18.3 | -0.18 | 1.89 | -0.7 | 2.24 | 118.52 |

(12=Src-Rpt-Sys Entity, 14=Detail by, 16=Report Date, 18=Order Type, 20=Size, 22=Filter/Amount/Order, 24=Detail)

| Size Category | Source Entity | System Entity | Report Entity | Order Originator | Market Maker | Order Type |
|---|---|---|---|---|---|---|
| All 1-5 Sizes | PUBLIC | NA | NA | NA | NA | Sum |
| All 1-5 Sizes | PUBLIC | NA | NA | NA | NA | Sum |
| All 1-5 Sizes | PUBLIC | NA | NA | NA | NA | Sum |
| All 1-5 Sizes | PUBLIC | NA | NA | NA | NA | Sum |

(50, 52, 54, 56, 58, 60, 62)

10

| Stocks L-All Stocks | Market Centers L-*AllMarkets | | At Quote | | Outside Quote | | Outside Quote Net | | | Covered Orders | | Covered Shares | |
|---|---|---|---|---|---|---|---|---|---|---|---|---|---|
| 26 ↙ | 28 ↙ | | 30 ↙ | | 32 ↙ | | 34 ↙ | | | 36 ↙ | | 38 ↙ | |
| Improved | Improved Net | | | | | | | | | | | | |
| % | Cents | | % | | % | | Cents | | | Count | | Shares | |
| 14.5 | 1.5 | | 71.8 | | 13.7 | | 2.84 | | | 1204552760 | | 59338139354 | |
| 14.9 | 1.48 | | 71.4 | | 13.7 | | 2.88 | | | 120726815 | | 59247991617 | |

| Market Center Id | Market Center Name | Symbol/Group | Description | Exec. Speed | Net / Share | Quoted Spread |
|---|---|---|---|---|---|---|
| NYSE | NY STOCK EX | BLS | BellSouth Corporation Com | 6.4 | -0.08 | 1.19 |
| ARCAX | ARCHIPELAGO EX | BLS | BellSouth Corporation Com | 1.5 | -0.14 | 1.18 |
| TMADF | BERNARD MADOFF | BLS | BellSouth Corporation Com | 3.9 | -0.07 | 1.26 |
| CHX | CHICAGO STOCK EX | BLS | BellSouth Corporation Com | 19.8 | -0.37 | 1.16 |
| ↑ 64 | ↑ 66 | ↑ 68 | ↑ 70 | ↑ 72 | ↑ 74 | ↑ 76 |

FIG. 1B

| Covered Orders | Covered | Covered Order Size | Executed Shares | Canceled Shares | Executed Away |
|---|---|---|---|---|---|
| 131638 | 71160334 | 540 | 81.8 | 18.1 | 0.3 |
| 11068 | 6849006 | 618 | 34.4 | 4.7 | 31.5 |
| 3532 | 1832239 | 518 | 99.9 | 0.1 | 0 |
| 1443 | 1133863 | 785 | 81.9 | 15.3 | 1.1 |
| ← 94 | ← 96 | ← 98 | ← 100 | ← 102 | ← 104 |

| Destination | Source | Speed | Improved % | Improved Net | Shares |
|---|---|---|---|---|---|
| ARCAX | Public | 1.5 | 1.8 | 1.35 | 6849006 |
| BSE | Public | 6.4 | 11.1 | 1.11 | 549437 |
| CHX | Public | 19.8 | 7.9 | 1.47 | 1133863 |
| NYSE | Public | 6.4 | 11.4 | 1.32 | 71160334 |
| TAUTO | Public | 5.5 | 50.1 | 0.27 | 969676 |
| TBRUT | Public | 4.3 | 1.6 | 1.09 | 224707 |
| TBTRD | Public | 32.4 | 5 | 1 | 63509 |
| TBWNT | Public | 6 | 0 | 0 | 400 |
| TCDRG | Public | 2.9 | 45.2 | 0.24 | 41153 |
| TINCA | Public | 1.9 | 5 | 1 | 5925 |
| TITGI | Public | 4.7 | 55.6 | 1.48 | 23210 |
| TMADF | Public | 3.9 | 6.2 | 1.2 | 1832239 |
| TNYFX | Public | 0.2 | 32.2 | 1.06 | 78242 |
| TOPCO | Public | 4.2 | 35.2 | 1 | 2334 |
| TPERT | Public | 30.6 | 8.1 | 1 | 105704 |
| TPRUS | Public | 69.8 | 0 | 0 | 15200 |
| TRYAN | Public | 11.8 | 1 | 1 | 23468 |
| TSBSH | Public | 0.2 | 10.4 | 1.04 | 134277 |
| TSIMT | Public | 3.4 | 4.5 | 2.73 | 628037 |
| TSSBS | Public | 16.5 | 10.1 | 1.18 | 463717 |
| TTMBR | Public | 0 | 0 | 0 | 4509 |
| TTRAC | Public | 0 | 0 | 0 | 27600 |
| TTRIM | Public | 5.6 | 20.1 | 0.16 | 1015774 |
| TUBSS | Public | 4.4 | 50.7 | 0.44 | 1002049 |

FIG. 2

| Destination | Source | Speed | Improved % | Improved Net | Shares |
|---|---|---|---|---|---|
| NYSE | Public | 6.4 | 11.4 | 1.32 | 71160334 |
| ARCAX | Public | 1.5 | 1.8 | 1.35 | 6849006 |
| TMADF | Public | 3.9 | 6.2 | 1.2 | 1832239 |
| CHX | Public | 19.8 | 7.9 | 1.47 | 1133863 |
| TTRIM | Public | 5.6 | 20.1 | 0.16 | 1015774 |
| TUBSS | Public | 4.4 | 50.7 | 0.44 | 1002049 |
| TAUTO | Public | 5.5 | 50.1 | 0.27 | 969676 |
| TSIMT | Public | 3.4 | 4.5 | 2.73 | 628037 |
| BSE | Public | 6.4 | 11.1 | 1.11 | 549437 |
| TSSBS | Public | 16.5 | 10.1 | 1.18 | 463717 |
| TBRUT | Public | 4.3 | 1.6 | 1.09 | 224707 |
| TSBSH | Public | 0.2 | 10.4 | 1.04 | 134277 |
| TPERT | Public | 30.6 | 8.1 | 1 | 105704 |
| TNYFX | Public | 0.2 | 32.2 | 1.06 | 78242 |
| TBTRD | Public | 32.4 | 5 | 1 | 63509 |
| TCDRG | Public | 2.9 | 45.2 | 0.24 | 41153 |
| TTRAC | Public | 0 | 0 | 0 | 27600 |
| TRYAN | Public | 11.8 | 1 | 1 | 23468 |
| TITGI | Public | 4.7 | 55.6 | 1.48 | 23210 |
| TPRUS | Public | 69.8 | 0 | 0 | 15200 |
| TINCA | Public | 1.9 | 5 | 1 | 5925 |
| TTMBR | Public | 0 | 0 | 0 | 4509 |
| TOPCO | Public | 4.2 | 35.2 | 1 | 2334 |
| TBWNT | Public | 6 | 0 | 0 | 400 |

FIG. 3

| Destination 202 | Source 204 | Speed 206 | Speed - Maximum Execution Speed Value 404 | Normalized = *(100/69.8) 406 | Shares 212 |
|---|---|---|---|---|---|
| TTRAC | Public | 0 | 69.8 | 100.0234 | 27600 |
| TTMBR | Public | 0 | 69.8 | 100.0234 | 4509 |
| TSBSH | Public | 0.2 | 69.6 | 99.7368 | 134277 |
| TNYFX | Public | 0.2 | 69.6 | 99.7368 | 78242 |
| ARCAX | Public | 1.5 | 68.3 | 97.8739 | 6849006 |
| TINCA | Public | 1.9 | 67.9 | 97.3007 | 5925 |
| TCDRG | Public | 2.9 | 66.9 | 95.8677 | 41153 |
| TSIMT | Public | 3.4 | 66.4 | 95.1512 | 628037 |
| TMADF | Public | 3.9 | 65.9 | 94.4347 | 1832239 |
| TOPCO | Public | 4.2 | 65.6 | 94.0048 | 2334 |
| TBRUT | Public | 4.3 | 65.5 | 93.8615 | 224707 |
| TUBSS | Public | 4.4 | 65.4 | 93.7182 | 1002049 |
| TITGI | Public | 4.7 | 65.1 | 93.2883 | 23210 |
| TAUTO | Public | 5.5 | 64.3 | 92.1419 | 969676 |
| TTRIM | Public | 5.6 | 64.2 | 91.9986 | 1015774 |
| TBWNT | Public | 6 | 63.8 | 91.4254 | 400 |
| NYSE | Public | 6.4 | 63.4 | 90.8522 | 71160334 |
| BSE | Public | 6.4 | 63.4 | 90.8522 | 549437 |
| TRYAN | Public | 11.8 | 58 | 83.114 | 23468 |
| TSSBS | Public | 16.5 | 53.3 | 76.3789 | 463717 |
| CHX | Public | 19.8 | 50 | 71.65 | 1133863 |
| TPERT | Public | 30.6 | 39.2 | 56.1736 | 105704 |
| TBTRD | Public | 32.4 | 37.4 | 53.5942 | 63509 |
| TPRUS | Public | 69.8 | 0 | 0 | 15200 |

| Destination 202 | Source 204 | Improved % 208 | Improved Net 210 | Improved Value 502 | Normalized Value =*(100/82.288) 504 | Shares 212 |
|---|---|---|---|---|---|---|
| TITGI | Public | 55.6 | 1.48 | 82.288 | 100 | 23210 |
| TOPCO | Public | 35.2 | 1 | 35.2 | 42.77658954 | 2334 |
| TNYFX | Public | 32.2 | 1.06 | 34.132 | 41.47870892 | 78242 |
| TUBSS | Public | 50.7 | 0.44 | 22.308 | 27.10966362 | 1002049 |
| NYSE | Public | 11.4 | 1.32 | 15.048 | 18.28699203 | 71160334 |
| TAUTO | Public | 50.1 | 0.27 | 13.527 | 16.43860587 | 969676 |
| BSE | Public | 11.1 | 1.11 | 12.321 | 14.97302158 | 549437 |
| TSIMT | Public | 4.5 | 2.73 | 12.285 | 14.9292728 | 628037 |
| TSSBS | Public | 10.1 | 1.18 | 11.918 | 14.48327824 | 463717 |
| CHX | Public | 7.9 | 1.47 | 11.613 | 14.11262882 | 1133863 |
| TCDRG | Public | 45.2 | 0.24 | 10.848 | 13.18296714 | 41153 |
| TSBSH | Public | 10.4 | 1.04 | 10.816 | 13.14407933 | 134277 |
| TPERT | Public | 8.1 | 1 | 8.1 | 9.84347657 | 105704 |
| TMADF | Public | 6.2 | 1.2 | 7.44 | 9.041415516 | 1832239 |
| TBTRD | Public | 5 | 1 | 5 | 6.076220105 | 63509 |
| TINCA | Public | 5 | 1 | 5 | 6.076220105 | 5925 |
| TRIM | Public | 20.1 | 0.16 | 3.216 | 3.908224772 | 1015774 |
| ARCAX | Public | 1.8 | 1.35 | 2.43 | 2.953042971 | 6849006 |
| TBRUT | Public | 1.6 | 1.09 | 1.744 | 2.119385573 | 224707 |
| TRYAN | Public | 1 | 1 | 1 | 1.215244021 | 23468 |
| TTRAC | Public | 0 | 0 | 0 | 0 | 27600 |
| TPRUS | Public | 0 | 0 | 0 | 0 | 15200 |
| TTMBR | Public | 0 | 0 | 0 | 0 | 4509 |
| TBWNT | Public | 0 | 0 | 0 | 0 | 400 |

| Destination Routing | Symbol | Index | Source | Status | Execution Speed | Improvement | At or Better | Outside | Effective Spread | TRIM | TNITE | TAUTO | TCDRG | CSE | TJEFF | CHX | TSSIC | TSCHB |
|---|---|---|---|---|---|---|---|---|---|---|---|---|---|---|---|---|---|---|
| CHX | MYL | 373.206 | SSIC | none | 4 | 3 | 5 | 5 | 5 | 329.63 | 0.0 | 332.872 | 353.598 | 0.0 | 0.0 | 373.206 | 0.0 | 381.925 |
| CHX | CCE | 145.309 | SSIC | re-route | 4 | 1 | 4 | 1 | 1 | 370.123 | 0.0 | 349.015 | 191.066 | 0.0 | 0.0 | 145.309 | 0.0 | 336.204 |
| CSE | Q | 317.904 | SSIC | none | 5 | 1 | 5 | 5 | 5 | 306.904 | 0.0 | 349.295 | 359.162 | 317.904 | 0.0 | 338.721 | 0.0 | 353.817 |
| CSE | GTW | 242.472 | SSIC | warn | 5 | 1 | 5 | 3 | 3 | 278.079 | 0.0 | 224.521 | 296.226 | 242.472 | 0.0 | 137.616 | 0.0 | 294.888 |
| TAUTO | LLTC | 426.839 | SSIC | none | 5 | 4 | 5 | 5 | 5 | 0.0 | 417.208 | 426.839 | 380.589 | 0.0 | 427.311 | 0.0 | 0.0 | 415.597 |
| TAUTO | EP | 183.552 | SSIC | re-route | 4 | 1 | 5 | 1 | 1 | 267.457 | 0.0 | 183.552 | 311.106 | 0.0 | 0.0 | 216.056 | 0.0 | 246.885 |
| TAUTO | NSM | 209.272 | SSIC | warn | 3 | 2 | 5 | 1 | 1 | 168.429 | 397.111 | 209.272 | 321.191 | 0.0 | 0.0 | 163.981 | 0.0 | 276.506 |
| TCDRG | XL | 482.715 | PUBLIC | none | 5 | 5 | 5 | 5 | 5 | 321.79 | 0.0 | 278.404 | 482.715 | 0.0 | 0.0 | 311.465 | 0.0 | 333.941 |
| TCDRG | MKC | 122.735 | PUBLIC | re-route | 1 | 1 | 4 | 2 | 2 | 345.64 | 0.0 | 365.934 | 122.735 | 0.0 | 0.0 | 397.397 | 0.0 | 396.63 |
| TCDRG | EXPD | 266.719 | SSIC | warn | 1 | 1 | 4 | 5 | 5 | 0.0 | 0.0 | 381.732 | 266.719 | 0.0 | 382.099 | 0.0 | 0.0 | 395.248 |
| TNITE | MSFT | 391.194 | SSIC | none | 5 | 1 | 5 | 5 | 5 | 0.0 | 391.194 | 395.009 | 393.131 | 0.0 | 400.918 | 100.0 | 393.988 | 395.045 |
| TNITE | QLGC | 116.292 | SSIC | re-route | 2 | 1 | 5 | 1 | 1 | 0.0 | 116.292 | 248.506 | 264.103 | 0.0 | 307.217 | 452.525 | 273.775 | 256.562 |
| TNITE | CTAS | 296.181 | SSIC | warn | 1 | 1 | 5 | 5 | 5 | 0.0 | 296.181 | 370.718 | 182.7 | 0.0 | 473.507 | 0.0 | 0.0 | 367.862 |
| TSSIC | ORCL | 375.961 | PUBLIC | none | 5 | 1 | 5 | 5 | 5 | 0.0 | 366.245 | 375.2 | 374.185 | 0.0 | 377.519 | 97.358 | 375.961 | 372.799 |
| TSSIC | JNPR | 273.199 | PUBLIC | warn | 5 | 1 | 5 | 5 | 5 | 0.0 | 239.592 | 287.477 | 286.43 | 0.0 | 247.857 | 470.977 | 273.199 | 279.694 |
| TSSIC | AMAT | 284.441 | PUBLIC | warn | 5 | 1 | 5 | 5 | 5 | 0.0 | 265.128 | 288.465 | 293.217 | 0.0 | 306.724 | 474.413 | 284.441 | 291.781 |
| TTRIM | PNC | 468.838 | SSIC | none | 5 | 5 | 5 | 5 | 5 | 468.838 | 0.0 | 389.669 | 479.157 | 0.0 | 0.0 | 392.533 | 0.0 | 420.367 |
| TTRIM | SNA | 129.816 | SSIC | re-route | 5 | 1 | 2 | 1 | 1 | 129.816 | 0.0 | 373.945 | 309.492 | 0.0 | 0.0 | 428.798 | 0.0 | 366.431 |
| TTRIM | STT | 184.816 | SSIC | re-route | 5 | 2 | 4 | 4 | 4 | 184.816 | 0.0 | 242.289 | 271.993 | 0.0 | 0.0 | 309.369 | 0.0 | 314.948 |
| TTRIM | HCR | 258.458 | SSIC | warn | 1 | 1 | 5 | 4 | 4 | 258.458 | 0.0 | 402.653 | 431.883 | 0.0 | 0.0 | 254.33 | 0.0 | 293.423 |

Warn and Re-route Counts 700

| Trading Center 702 | Re-routes 704 | Warns 706 | Total 708 |
|---|---|---|---|
| CHX | 1 | 0 | 1 |
| CSE | 0 | 2 | 2 |
| AUTO | 2 | 7 | 9 |
| CDRG | 9 | 27 | 36 |
| NITE | 1 | 7 | 8 |
| SSIC | 0 | 2 | 2 |
| TRIM | 3 | 36 | 39 |
| Total | 16 | 81 | 97 |

FIG. 7

METHOD AND SYSTEM FOR EVALUATION OF MARKET CENTERS FOR SECURITY TRADING PERFORMANCE

FIELD OF THE INVENTION

The present invention relates to the field of evaluating market centers for security, e.g., stock, trading performance. In particular, the present invention relates to evaluating execution quality on a stock-by-stock basis at a market center over a period of time and creates an index that determines what market centers are underperforming.

BACKGROUND OF THE INVENTION

It is a difficult process to ascertain what market center is currently performing at the highest quality level. It is important to the customer that any stock transaction occurs in the most efficient manner possible so that the stock is sold as close as possible to the quoted price, or better, in the shortest period of time. For quality customer service it is desirable to be warned if the market center is statistically below expectations and re-route the stock transaction if the underperformance of the market center is significant.

Unfortunately, it is difficult to always ascertain which market center can provide the customer with the best possible results since a number of factors affect the total quality of the securities transaction. For example, the securities transaction may be executed in a very short period of time but the sales price may be significantly below the quoted price. Therefore, it is important to be able to analyze the performance of a market center in real time to attempt to not only meet the customer's expectations but exceed them.

Therefore, there is a significant need to evaluate market center performance, in real time, for a plurality of criteria. Moreover, it would be very valuable to be able to focus on problem areas with a combined index that provides a single numerical indication regarding overall market center performance. The present invention is directed to overcoming one or more of the problems set forth above.

SUMMARY OF INVENTION

In one aspect of this invention, a method for creating an index value for evaluating market center execution quality, with at least one processor, on a security-by-security basis over a period of time is disclosed. This method includes utilizing an execution speed of a predetermined order of covered security orders that were executed at a market center to create a first value, utilizing price improvement of a predetermined order of covered security orders that were executed at a market center to create a second value, utilizing a percentage of covered security orders that were executed at a market center at a quoted value or a better value to create a third value, utilizing a percentage of covered security orders that were executed at outside a quoted value to create a fourth value, utilizing effective spread, which is twice an absolute value of a difference between an execution price for a securities order and a midpoint of a consolidated best bid and offer at a time of a securities order receipt to create a fifth value, and summing at least two of the first value, the second value, the third value, the fourth value, and the fifth value to create an index value.

In another aspect of this invention, a method for creating an index value for evaluating market center execution quality, with at least one processor, on a security-by-security basis over a period of time is disclosed. This method includes utilizing an execution speed of a predetermined order of covered security orders that were executed at a market center to create a first value, utilizing price improvement of a predetermined order of covered security orders that were executed at a market center to create a second value, utilizing a percentage of covered security orders that were executed at a market center at a quoted value or a better value to create a third value, utilizing a percentage of covered security orders that were executed at outside a quoted value to create a fourth value, utilizing effective spread, which is twice an absolute value of a difference between an execution price for a securities order and a midpoint of a consolidated best bid and offer at a time of a securities order receipt to create a fifth value, and summing the first value, the second value, the third value, the fourth value, and the fifth value to create an index value.

In still another aspect of this invention, a system for creating an index value for evaluating market center execution quality, with at least one processor, on a security-by-security basis over a period of time is disclosed. This system includes at least one processor that calculates and sums at least two of the following values including a first value that correlates to an execution speed of a predetermined order of covered security orders that were executed at a market center, a second value that correlates to price improvement of a predetermined order of covered security orders that were executed at a market center, a third value that correlates to a percentage of covered security orders that were executed at a market center at a quoted value or a better value, a fourth value that correlates to a percentage of covered security orders that were executed at outside the quoted value and a fifth value that correlates to effective spread, which is twice an absolute value of a difference between an execution price of a securities order and a midpoint of a consolidated best bid and offer at a time of a securities order receipt.

In yet another aspect of this invention, a system for creating an index value for evaluating market center execution quality, with at least one processor, on a security-by-security basis over a period of time is disclosed. This system includes at least one processor that calculates and sums at least two of the following values including a first value that correlates to an execution speed of a predetermined order of covered security orders that were executed at a market center, a second value that correlates to price improvement of a predetermined order of covered security orders that were executed at a market center, a third value that correlates to a percentage of covered security orders that were executed at a market center at a quoted value or a better value, a fourth value that correlates to a percentage of covered security orders that were executed at outside the quoted value and a fifth value that correlates to an effective spread, which is twice an absolute value of a difference between an execution price of a securities order and the midpoint of a consolidated best bid and offer at the time of a securities order receipt.

These are merely some of the innumerable aspects of the present invention and should not be deemed an all-inclusive listing of the innumerable aspects associated with the present invention.

BRIEF DESCRIPTION OF DRAWINGS

For a better understanding of the present invention, reference may be made to the accompanying drawings in which:

FIGS. 1A, 1B, 1C, 1D provide an illustrative output of data received from a third-party data-analysis firm for use in computing an index in accordance with the present invention;

FIG. 2 provides an exemplary tabulation of raw values including a destination market center, a source of securities, a speed of execution, an improvement percentage (%), improvement net, and a number of shares of securities in an order;

FIG. 3 is the exemplary tabulation of raw values including a destination market center, a source of securities, a speed of execution, an improvement percentage (%), improvement net, and the number of shares of securities shown in FIG. 2, which have been sorted by volume of shares of securities per order in descending order;

FIG. 4 is an exemplary tabulation of values including a destination market center, a source of securities, a speed of execution, a value of execution speed minus the maximum value for all execution speeds, a normalized value of speed and a volume of shares of securities;

FIG. 5 is an exemplary tabulation of values including a destination market center, a source of securities, an improvement percentage (%), an improvement net, an improvement value, a normalized improvement value in descending order and a volume of shares of securities in an order;

FIG. 6 is an exemplary tabulation of values including a routing destination, a securities symbol, an index computed according to the present invention, a status indication, values for execution speed, values for improvement, values for "at or better", values for outside, values for effective spread, and a series of columns for the index of the present invention computed for nine (9) illustrative market centers; and FIG. 7 is an exemplary tabulation of predetermined events, e.g., warnings and re-routes and summations thereof.

DETAILED DESCRIPTION OF THE INVENTION

Figure 1A:
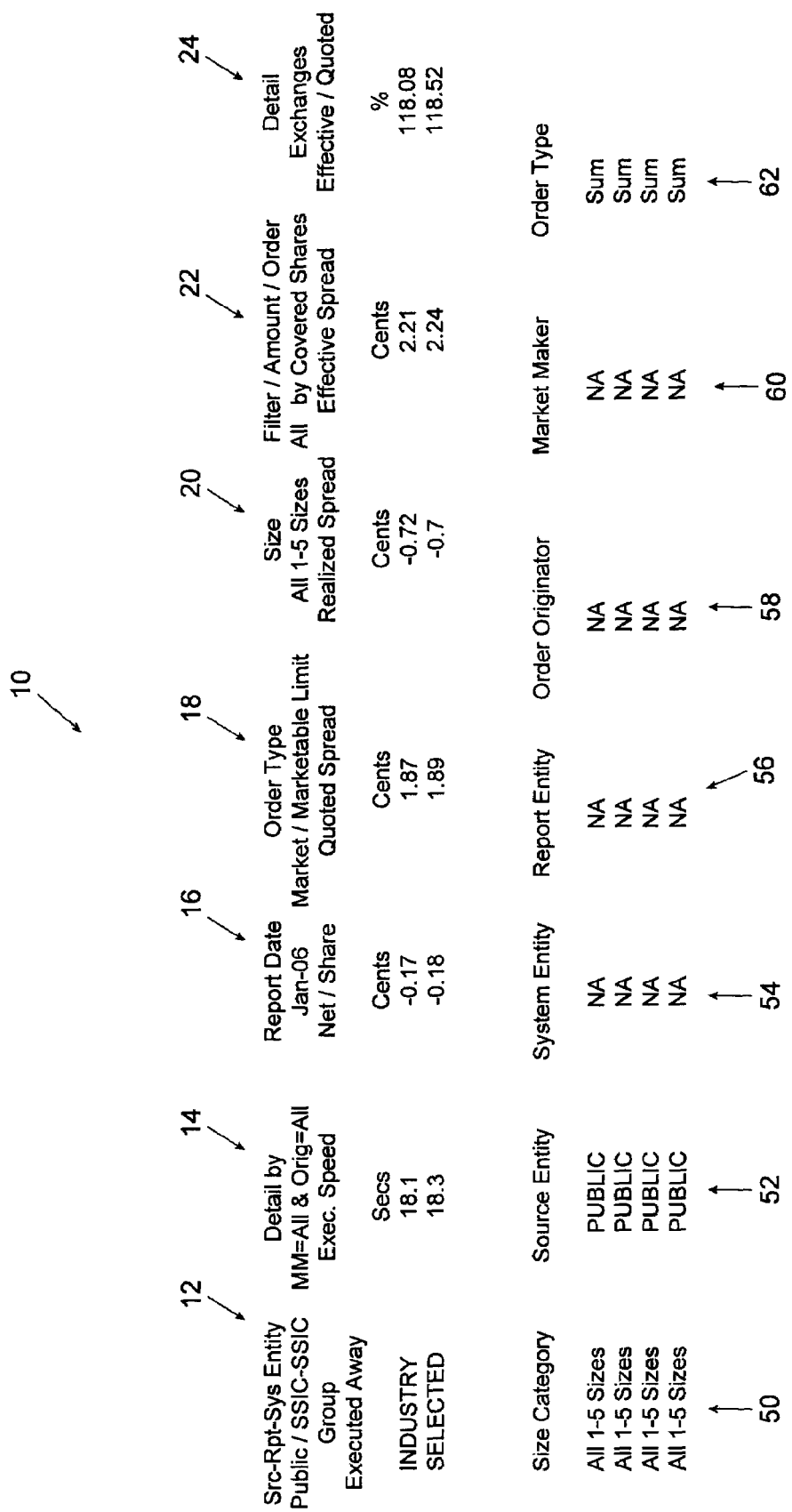

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention.

The present invention is a method and associated system for evaluation of a market center for stock trading performance for the best performing market center as well as being able to identify underperforming market centers based on Securities and Exchange Commissions' Rule 605 statistics. A market center is defined as any exchange market maker, OTC market maker, alternative trading system, national securities exchange, or national securities association. The present invention is directed to an index that provides analysis of market center performance.

This index includes a combination of at least two factors to create an index that are based on the following measurements: speed of execution; price improvement; at the quote or better percentage; outside the quote percentage (disimprovement); and effective spread. Although the preferred factor is a normalized value; any value based on, derived from, or correlated to these factors can be utilized in creating the combined index of the present invention.

A "market order" is defined as order to buy or sell securities at the best price available on the market and a "marketable limit order" is any buy order with a limit price equal to or greater than the consolidated best offer at the time of order receipt, and any sell order with a limit price equal to or less than the consolidated best bid at the time of order receipt. Moreover, the "consolidated best bid and offer" is the highest firm bid and the lowest firm offer for a security that is calculated and disseminated on a current and continuous basis pursuant to an effective national market system plan.

There are three types of limit offers, these include an inside-the-quote limit offer, an at-the-quote limit offer and a near-the quote limit offer. An "inside-the-quote limit offer" is defined as: "non-marketable buy orders having limit prices that are higher by $0.10 than the consolidated best bid at the time of order receipt and non-marketable sell orders having limit prices that are lower by $0.10 than the consolidated best offer at the time of order receipt." An "at-the-quote limit" is defined as: "non-marketable buy orders having limit prices that are equal to the consolidated best bid at the time of order receipt and non-marketable sell orders having limit prices that are equal to the consolidated best offer at the time of order receipt." A "near-the quote limit order" is defined as: "non-marketable buy orders having limit prices that are lower by $0.10 or less than the consolidated best bid at the time of order receipt and non-marketable sell orders having limit prices that are higher by $0.10 or less than the consolidated best offer at the time of order receipt."

The term "covered" is defined as: "any market order or any limit order [including immediate-or-cancel orders] received by a market center during regular trading hours at a time when a consolidated best bid and offer is being disseminated, and, if executed, is executed during regular trading hours, but shall exclude any order for which the customer requests special handling for execution, including, but not limited to, orders to be executed at a market opening price or a market closing price, orders submitted with stop prices, orders to be executed only at their full size, orders to be executed on a particular type of tick or bid, orders submitted on a "not held" basis, orders for other than regular settlement, and orders to be executed at prices unrelated to the market price of the security at the time of execution." The "covered order count" is the number of covered shares of securities and the "covered order size" is the average number of shares of securities in a covered order.

The speed of execution is in seconds and is defined as the average time (to the 1/10th of a second) that covered orders were executed. Execution speed is measured from the time an order was received by a market center to the time it was executed. The "executed shares percentage ("%")" is the executed shares as a percentage of covered shares and the "executed shares" are the total number of shares of securities that were executed and not covered.

"Improvement" is defined as the percentage of shares executed with price improvement times the "net improved." "Price improvement" is defined as difference between the execution price and the National Best Bid and Offer ("NBBO") for a buy order when the NBBO offer is greater than the execution price and is defined as the difference between the execution price and the NBBO bid when the execution price is greater than the NBBO bid for a sell order. The percentage ("%") of price improvement is the percentage of those shares of securities that are executed with price improvement. The term "net improved" is defined as the average in cents (¢) per share of shares of securities for those shares having price improvement.

The term "at the quote or better percentage" is defined as the percentage of shares executed at the quote or better than the quote. "At quote" shares are the total number of shares of covered orders executed at a quote; classified for: buy orders as those executed at a price equal to the consolidated best offer at the time of order receipt; and sell orders as those executed at a price equal to the consolidated best bid at the time of order receipt.

The term "or better" means those shares with price improvement as previously defined above. The term "at the quote or better percentage" is the sum of the percentage of "at quote" shares of securities of the total executed shares of securities and the sum of the percentage of the shares of securities with price improvement of the total executed shares of securities.

The term "outside the quote percentage (disimprovement)" is defined as the difference between the execution price and the NBBO offer for a buy order when the execution price is greater than the NBBO offer and is defined as the difference between the execution price and the NBBO bid when the NBBO bid is greater than execution price for a sell order. This is found by multiplying the percent (%) of shares that are executed outside the quote percentage times the "net outside" which is the shares disimproved multiplied by shares disimproved (¢) weighted by the total number of executed shares.

The term "effective spread" is defined as twice a difference between an execution price for a securities order and a midpoint of a consolidated best bid and offer ("BBO") at a time of a securities order receipt for a buy order and twice a difference between a midpoint of a consolidated best bid and offer ("BBO") at a time of a securities order receipt and an execution price for a securities order for a sell order.

The basic raw data can be provided from a vendor, e.g., Market Systems Inc. (MSI), an independent, third-party data-analysis firm having a place of business at 20 North Wacker Drive, Suite 3400, Chicago, Ill. This data is generally indicated by numeral 10 in FIGS. 1A, 1B, 1C, and 1D. There is an indication of a targeted industry and selected securities is indicated by numeral 12 as shown in FIG. 1A. In this illustrative, but nonlimiting case, the shares of securities that are "executed away" are selected. The term "executed away" is defined as the total number of shares of covered orders that were executed at a market center other than an SEC Rule 605 reporting market center.

An execution speed for a targeted industry of securities and a selected group of securities ("executed away") is indicated by numeral 14. A net/share in cents for a targeted industry of securities and a selected group of securities ("executed away") is indicated by numeral 16. The term "net/share in cents" ("¢") is the net amount of shares improved multiplied by shares improved (¢) and shares disimproved multiplied by shares disimproved ("¢") weighted by the total number of executed shares.

A quoted spread in cents for a targeted industry of securities and a selected group of securities ("executed away") is indicated by numeral 18. The term "quoted spread" is defined as the difference between the NBBO offer and the NBBO bid at the time of order entry weighted by the number of shares executed.

A realized spread in cents for a targeted industry of securities and a selected group of securities ("executed away") is indicated by numeral 20. The term "realized spread" is defined as the share-weighted average of realized spreads for executed orders, calculated for: buy orders as twice the difference between the execution price and the midpoint of the consolidated best bid and offer five minutes after the time of order execution and sell orders as twice the difference between the midpoint of the consolidated best bid and offer five minutes after the time of order execution and the execution price.

An effective spread in cents for a targeted industry of securities and a selected group of securities ("executed away") is indicated by numeral 22. The term "effective spread" is defined as the share-weighted average of effective spreads for executed orders, calculated for: buy orders as twice the difference between the execution price and the midpoint of the consolidated best bid and offer ("BBO") at the time of order receipt and sell orders as twice the difference between the midpoint of the consolidated best bid and offer (BBO) at the time of order receipt and the execution price.

An effective/quoted percentage for a targeted industry of securities and a selected group of securities ("executed away") is indicated by numeral 24. The term "effective/quoted percentage" is defined as the ratio of the effective spread to the quoted spread at the time of the order receipt. Also, trading at the quote results in a percentage of 100%; trading inside the quotes results in a percentage less than 100%; and trading outside the quotes results in a percentage greater than 100%.

A percentage of securities having an improved percentage for a targeted industry of securities and a selected group of securities ("executed away") is indicated by numeral 26, as shown in FIG. 1B. The term "improved percentage" is defined as the percentage of shares executed with price improvement. Price improvement is previously defined above.

A percentage of securities having an improved net in cents ("¢") for a targeted industry of securities and a selected group of securities ("executed away") is indicated by numeral 28. The term "improved net in cents" ("¢") is defined as the average cents (¢) per share that shares with price improvement. It is calculated for: buy orders when executed at a price lower than the consolidated best offer at the time of order receipt and sell orders when executed at a price higher than the consolidated best bid at the time of order receipt.

A percentage of securities at quote for a targeted industry of securities and a selected group of securities ("executed away") are indicated by numeral 30. The term "at quote" is defined as the total number of shares of covered orders executed at the quote; classified for buy orders as those executed at a price equal to the consolidated best offer at the time of order receipt and sell orders as those executed at a price equal to the consolidated best bid at the time of order receipt.

A percentage of securities outside quote for a targeted industry of securities and a selected group of securities ("executed away") are indicated by numeral 32. The term "outside quote percentage" is defined as the percentage of shares executed outside the quote.

A securities outside quote net in cents (¢) for a targeted industry of securities and a selected group of securities ("executed away") is indicated by numeral 34. The term "outside quote" is as the average cents (¢) per share of shares executed outside the quote, which is calculated for buy orders when executed at a price higher than the consolidated best offer at the time of order receipt and sell orders when executed at a price lower than the consolidated best bid at the time of order receipt.

The securities that are covered orders for a targeted industry of securities and a selected group of securities ("executed away") is indicated by numeral 36. The term "covered orders" is defined as the total number of covered orders.

The securities that are covered shares for a targeted industry of securities and a selected group of securities ("executed away") is indicated by numeral 38. The term "covered shares" is defined previously above.

Figure 1C:
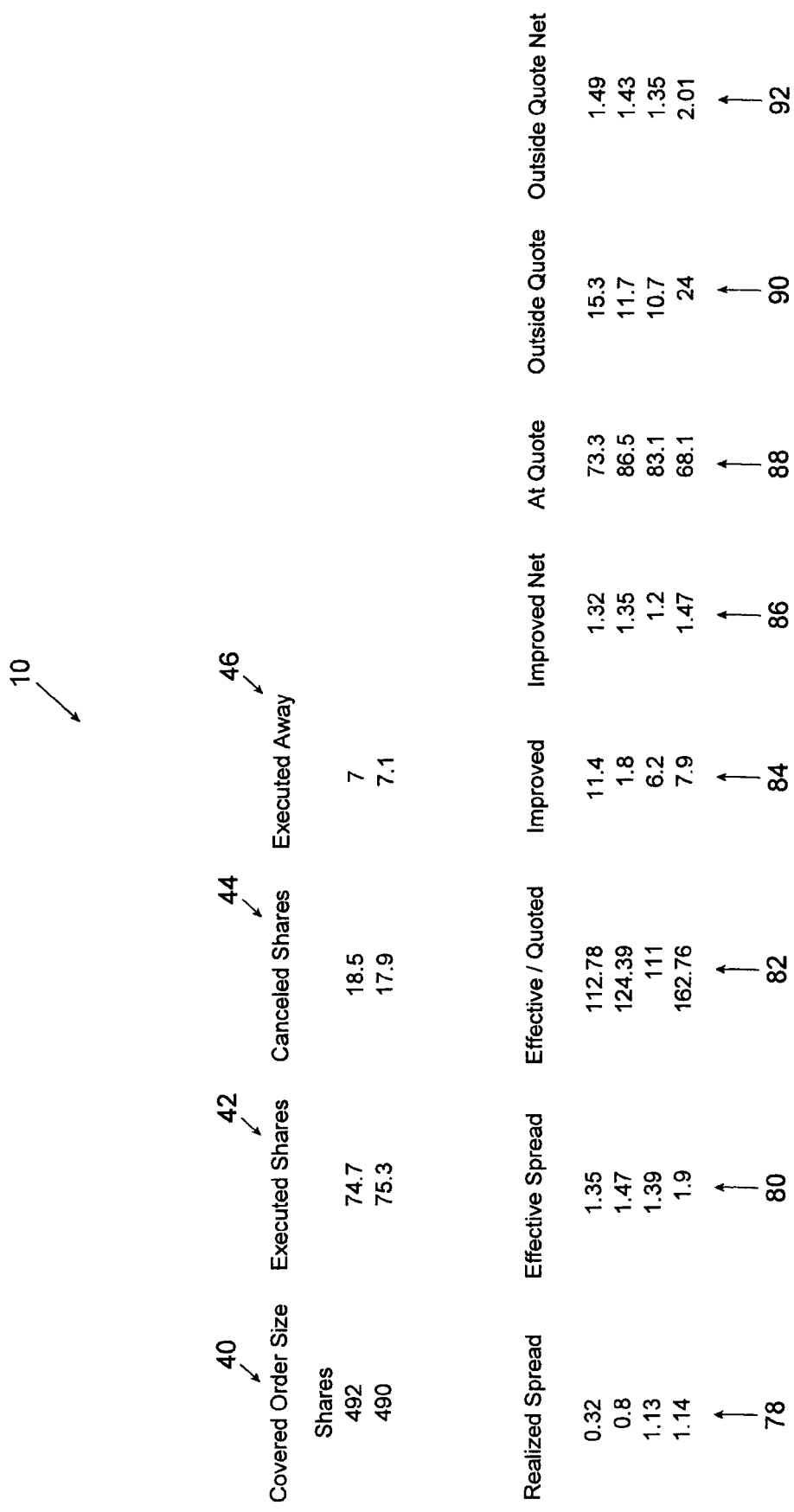

The securities that are a covered order size for a targeted industry of securities and a selected group of securities ("executed away") is indicated by numeral 40, which is shown in FIG. 1C. The term "covered order size" is defined as the average number of shares per covered order.

The securities that are executed shares for a targeted industry of securities and a selected group of securities ("executed shares") is indicated by numeral 42. The term "executed shares" is defined as the total number of shares of securities executed that were covered and not excluded.

The securities that are canceled shares for a targeted industry of securities and a selected group of securities ("canceled shares") is indicated by numeral 44. The term "canceled shares" is defined as the total number of shares of covered orders canceled.

The securities that are executed away shares for a targeted industry of securities and a selected group of securities ("executed away shares") is indicated by numeral 46. The term "executed away" is defined as the total number of shares of covered orders that were executed at a market center other than the SEC Rule 605 reporting market center.

There is also provided in the data from the third party provider 10 includes columns of data regarding a listing of the size of the industry 50, e.g., all industry sizes, as shown in FIG. 1A. Classification by size of orders into the following separate categories: 100 to 499 shares; 500 to 1999 shares; 2000 to 4999 shares; and 5000 to 9999 shares.

A second column of data includes the source of information regarding the transaction 52, e.g., public. Public data is where a third party market maker reported the data versus private data where a specific securities trading organization, e.g., Scottrade, Inc., provides the data.

A third column of data includes the system entity 54, e.g., not applicable ("NA") and a fourth column of data that includes a report entity 56, e.g., not applicable ("NA"). A fifth column of data that includes an order originator 58, e.g., not applicable ("NA"), a sixth column of data that includes a market maker 60, e.g., not applicable ("NA") and a seventh column of data that includes an order type 62, e.g., Sum.

An eighth column of data includes a market center identification ("Id") 64, e.g., NYSE, as shown in FIG. 1B. There is a ninth column of data that is directed to the full market center name 66, e.g., New York Stock Exchange, and a tenth column that provides a symbol of a particular security 68, e.g., BLS. Also, there is an eleventh column that provides a full name (description) of a particular security 70, e.g., BellSouth Corporation Com.

There is a twelfth column of data that includes the execution speed 72, which as previously described is the average time (to the 1/10th of a second) that covered securities orders were executed. Execution speed is measured from the time an order was received by a market center to the time it was executed.

A thirteenth column of data includes net/share 74. The term "net/share" is defined as the net amount of shares of securities improved multiplied by shares of securities improved (¢) and shares of securities disimproved multiplied by shares of securities disimproved (¢) weighted by the total number of executed shares of securities.

A fourteenth column of data includes quoted spread 76. The term "quoted spread" is defined as the difference between the NBBO offer and the NBBO bid at the time of order entry weighted by the number of shares of securities executed.

A fifteenth column of data includes realized spread 78 as shown in FIG. 1C. The term "realized spread" is defined as the share-weighted average of realized spreads for executed orders, calculated for buy orders as twice the difference between the execution price and the midpoint of the consolidated best bid and offer five minutes after the time of order execution and sell orders as twice the difference between the midpoint of the consolidated best bid and offer five minutes after the time of order execution and the execution price.

A sixteenth column of data includes effective spread 80. The term "effective spread" is defined as the share-weighted average of effective spreads for executed orders, calculated for buy orders as twice the difference between the execution price and the midpoint of the consolidated best bid and offer ("BBO") at the time of order receipt and sell orders as twice the difference between the midpoint of the consolidated best bid and offer ("BBO") at the time of order receipt and the execution price.

A seventeenth column of data includes effective/quoted 82. The term "effective/quoted" is defined as the ratio of the effective spread to the quoted spread at the time of the order receipt. Trading at the quote results in a percentage of 100%; trading inside the quotes results in a percentage less than 100%; trading outside the quotes results in a percentage greater than 100%.

An eighteenth column of data includes improved 84. The term "improved" is defined as the number of shares of covered orders executed with price improvement; classified for buy orders as those executed at a price lower than the consolidated best offer at the time of order receipt and sell orders as those executed at a price higher than the consolidated best bid at the time of order receipt.

A nineteenth column of data includes improved net 86. The term "improved net" is defined as the average cents (¢) per share of shares of securities with price improvement. It is calculated for buy orders when executed at a price lower than the consolidated best offer at the time of order receipt and sell orders when executed at a price higher than the consolidated best bid at the time of order receipt.

A twentieth column of data includes at quote 88. The term "at quote" is defined as the total number of shares of covered orders executed at the quote; classified for buy orders as those executed at a price equal to the consolidated best offer at the time of order receipt and sell orders as those executed at a price equal to the consolidated best bid at the time of order receipt.

A twenty-first column of data includes outside quote 90. The term "outside quote" is defined as the total number of shares of covered orders executed outside the quote (with price disimprovement) classified for buy orders as those executed at a price higher than the consolidated best offer at the time of order receipt and sell orders as those executed at a price lower than the consolidated best bid at the time of order receipt.

A twenty-second column of data includes outside quote net 92. The term "outside quote net" is defined as the average cents (¢) per share of shares executed outside the quote. This is calculated for buy orders when executed at a price higher than the consolidated best offer at the time of order receipt and sell orders when executed at a price lower than the consolidated best bid at the time of order receipt.

A twenty-third column of data includes covered orders 94, as shown in FIG. 1D. The term "covered orders" is defined as the total number of the covered orders. The twenty-fourth column of data includes number of covered shares 96. The term "covered" was previously defined above. The twenty-fifth column of data includes a covered order size 98, which is the average number of shares per covered order.

A twenty-sixth column of data includes executed shares 100. The term "executed shares" is defined as the total number of shares executed that were covered and not excluded. The twenty-seventh column of data includes canceled shares 102. The term "canceled shares" includes the total number of shares of covered orders that were canceled.

The twenty-eighth column of data includes executed away shares 104. The term "executed away" includes the total number of shares of covered orders that were executed at a market center other than the SEC Rule 605 reporting market center.

A first step in the process is the loading of a route map, which is basically a routing table. This is followed by the loading of raw data that is preferably sorted by security trading symbol. After completion of this step, there is a map from symbols to data for every market center that executes that particular symbol with a breakdown of desired variables utilized in creating an index.

The desired information for developing an index is extracted from the raw data, which is indicated by numeral 200, as shown in FIG. 2. This includes a destination market center 202, a source of the data 204, e.g., public, an execution speed 206, an improvement percentage 208, which is the percentage of shares executed with price improvement, an improved net 210, which is the average cents per share of shares with price improvement, and a total number of executed shares 212.

Trimming may be utilized. If trimming is enabled, we either take the top "n" executors or the top percentage ("%") of executors can be selected. The purpose of trimming is to eliminate the provision of values in computing of the index for small transactions of share execution. Typically trimming, by default, is disabled. With trimming disabled, the routing destination is held to a higher standard. The rationale for trimming is that if a particular market center executes only one (1) order for 100 shares and they execute it in zero (0) seconds, there is a price improvement for each share of one dollar ($1). This will then definitely set the bar for the other market centers that may have executed large orders for a large number of shares of securities, e.g., 100,000 orders for 150,000,000 shares.

The data 200 from FIG. 2 is then sorted by number of shares of securities found in column 217 in descending order, which is indicated by numeral 300 that is shown in FIG. 3. This again includes a destination market center 202, a source of the data 204, e.g., public, an execution speed 206, an improvement percentage 208, which is the percentage of shares executed with price improvement, an improved net 210, which is the average cents per share of shares with price improvement, and the total number of executed shares 212.

The next values that are calculated are the normalized values for execution speed, as indicated by numeral 400 in FIG. 4. This again includes a destination market center 202 and a source of the data 204, e.g., public. There is a column of values for execution speed 206 that are listed in descending order. There is also a column of values of the largest value of speed, e.g., 69.8, from column 206 in FIGS. 2 and 3 minus the execution speed that is indicated by numeral 404. There is a column of normalized data values 406 which is a conversion factor that is equal to one hundred (100) divided by the maximum execution speed, where this quotient is then multiplied by a value in the column indicated by numeral 404. The total number of executed shares is again listed in the column designated by numeral 212.

The next values that are calculated are the normalized values for improvement, as indicated by numeral 500 in FIG. 5. This again includes a destination market center 202 and a source of the data 204, e.g., public. The values in improvement percentage 208, which is the percentage of shares executed with price improvement, and an improved net 210, listed in descending order, which is the average cents per share of shares with price improvement are multiplied together to form an improved value. This data is located in the column indicated by numeral 502. These improved values 502 are then normalized, which is a value of one hundred (100) divided by the maximum improvement value, where this quotient is then multiplied by an improved value in the column indicated by numeral 502. These improved values are listed in the column designated by numeral 504.

The normalized values for the "at quote or better percentage", "outside the quote and percent disimprovement" and "effective spread" are tabulated and calculated in a similar manner. However, for the values that are better when smaller, such as "outside the quote and percent disimprovement" and "effective spread", the smallest value is set to one hundred (100) in creation of this value. From a practical computing perspective, values of zero (0) are set to a small value, e.g., 0.1, to avoid division by zero. The values are again sorted in descending order and the conversion factor is one hundred (100) divided by the largest value of that value. The conversion factor is then multiplied by a specific value associated with a specific securities execution.

Although at least two of these five factors are utilized, the preferred, nonlimiting, embodiment sums all five normalized values together for an index that is less than five hundred (500). Although preferably each factor, if five (5) factors are utilized in creating the index, may be twenty percent ("20%"), any percentage can be utilized that sums to one hundred percent ("100%").

Preferably, S.E.C. Rule 605 public and/or private data for each covered security being reviewed is used as a starting point. The data is processed using the index algorithm. The index algorithm essentially compares and ranks each market center available for routing against each other for each of the five factors. The algorithm then normalizes the data in each category so that each value ranges from zero (0) to one hundred (100). The trading center with the best performance in a factor receives an index value of one hundred (100). The remaining trading centers receive an index value by multiplying their raw score by the normalization multiplier. The index values for each of the five categories are added together to obtain a number between zero (0) and five hundred (500). All market centers that have Rule 605 data can be utilized in the comparison, however, other factors can be utilized to reduce the number of market centers evaluated, e.g., a minimum number of shares of securities traded. The index is configurable with regard to a number of factors, including number of categories from the third party data report used for the calculation of a minimum number of shares to be counted in the comparisons (or a formula to create a cutoff), and weights for each category.

An illustrative output is provided by FIG. 6 and generally indicated by numeral 600. There is: a column to indicate the market center destination indicated by numeral 602; a column to indicate a symbol representing a specific type of security 604; a column providing index of normalized values computed in accordance with the present invention 606; and a column that indicates the market center source of the data regarding the executed securities 608. There is a column that provides an indication if any status was conferred on the normalized values found in column 610. If a market center has a normalized index value utilizing five variables of less than 200, the securities are identified as "re-route." If a market center has a normalized index value utilizing five variables of less than 300, the stock is identified as "warn." Otherwise, there is no status indicated in the illustrative, but nonlimiting, preferred embodiment.

When a security is identified as a re-route or a warn, below are the follow-up procedures: 1. Before notifying the market center handling stocks identified as a "re-route," determine whether there is a materially better place to which to reroute and make an initial determination by running index values for all market centers handling the stock; 2. If there is an alternative market center, notify the destination of the "re-route" and request a response. If market center does not provide an adequate response within a predetermined number of business days, e.g., seven (7) business days, generally we should reroute the stock on the following business day. Decisions to be made by the Director of Trading Service or his designee; 3. If a destination has any "warn" stocks, notify the destination of the warning, and request a response. If the market does not provide an adequate response, i.e., how it will improve, within a predetermined number of business days, e.g., seven (7) business days, conduct the analysis required in step 1 above and if there is an alternative market center reroute, generally we should reroute to a new destination after a predetermined number of days, e.g., thirty (30) days. Decisions may be made by a designated and appropriate individual, e.g., the Director of Trading Service or his designee; and 4. The designated and appropriate individual, e.g., the Director of Trading Service or his designee should report to a designated authority, e.g., the BestEx Committee, on a predetermined basis, e.g., monthly basis, the index results, and associated actions that were taken.

The five component pieces are also contained in the output so we can determine in which category the trading center is underperforming. For example, a numeral value between zero (0) and five (5) is provided in columns 612, 614, 616, 618 and 620 for values of execution speed, improvement, at or better, outside the quote percentage, and effective spread, respectively. In this example, there is a listing of index values for a variety of market centers. These include: a first market center 622, e.g., TTRIM, a second market center 624, e.g., TNITE, a third market center 626, e.g., TAUTO, a fourth market center 628, e.g., TCDRG, a fifth market center 630, e.g., CSE, a sixth market center 632, e.g., TJEFF, a seventh market center 634, e.g., CHX, an eighth market center 636, e.g., TSSIC, and a ninth market center 638, e.g., TSCHB. Typically the MPID is converted to a third party data supplier's, e.g., MSI's, pneumonic such as RENN is equal to TSSIC and NITE is equal to TNITE, and so forth.

A table of events is indicated by numeral 700 on FIG. 7. This includes a column of trading centers 702, a column of re-routing events 704, a column of warning situations 706 and a column 708 that totals the combination of re-routing events and warning situations.

This index value 606 provides us with the performance of the trading center that we have routed relative to the best performer of a market center for that stock in each category. If a particular market center is the best performer across all categories then the score will be 500, if it is the worst then the index value 606 will be less than 500. Preferably, the five factors are equally weighted (currently equally weighted at 20%) components. The output preferably, but not necessarily, may include a spreadsheet with three primary columns that include a securities symbol, a securities trading company's destination, and the index value of the present invention. The five component factors are also contained in the output so we can determine in which category a market center is underperforming. The spreadsheet is then sorted, preferably but not necessarily, by index value so that the securities symbols with the worst index values are evaluated first.

Another use of the index values of the present invention is to compare public data index scores to private data index scores obtained through a specific securities trading company, e.g., Scottrade, Inc. There can be a comparison of the public index scores to private data index scores for selected securities. Securities can be identified where the private index value is a predetermined percentage value, e.g., ten percent (10%), worse than the public index value. Either an explanation can be provided or a correction plan can be determined. The purpose of this review is to review trading center performance relative to a client's orders/executions. There is an expectation that the private data index scores should meet or exceed public index data scores unless there are ascertainable extenuating circumstances.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes" and "including" and similar terms as used in the foregoing specification are used in the sense of "optional" or "may include" and not as "required. " Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A method for creating an index value for evaluating market center execution quality, with at least one processor, on a security-by-security basis over a period of time comprising:
    utilizing an execution speed of a preexisting order of covered security orders that were executed at a market center to create a first value from empirical measurements;
    utilizing price improvement of a preexisting order of covered security orders that were executed at a market center to create a second value from empirical measurements;
    utilizing a percentage of covered security orders that were executed at a market center at a quoted value or a better value to create a third value from empirical measurements;
    utilizing a percentage of covered security orders that were executed at outside a quoted value to create a fourth value from empirical measurements;
    utilizing effective spread, which is twice an absolute value of a difference between an execution price for a securities order and a midpoint of a consolidated best bid and offer at a time of a securities order receipt to create a fifth value from empirical measurements;
    summing at least two of the first value, the second value, the third value, the fourth value, and the fifth value to create an index value; and
    wherein the utilizing and summing steps are performed by the at least one processor.

2. The method for creating an index value for evaluating market center execution quality, with at least one processor, on a security-by-security basis over a period of time according to claim 1, further comprising normalizing at least one of the first value, the second value, the third value, the fourth value and the fifth value.

3. The method for creating an index value for evaluating market center execution quality, with at least one processor, on a security-by-security basis over a period of time according to claim 1, wherein the index value is computed for at least one marketing center.

4. The method for creating an index value for evaluating market center execution quality, with at least one processor, on a security-by-security basis over a period of time according to claim 1, further comprising providing a warning message when the index value falls below a first level.

5. The method for creating an index value for evaluating market center execution quality, with at least one processor, on a security-by-security basis over a period of time according to claim 1, further comprising rerouting a securities transaction to another market center when the index value falls below a second level.

6. The method for creating an index value for evaluating market center execution quality, with at least one processor, on a security-by-security basis over a period of time according to claim 1, further comprising providing a warning message when the index value falls below a first level and rerouting a securities transaction to another market center when the index value falls below a second level.

7. The method for creating an index value for evaluating market center execution quality, with at least one processor, on a security-by-security basis over a period of time according to claim 6, further comprising utilizing a protocol to handle warning messages and rerouting events.

8. The method for creating an index value for evaluating market center execution quality, with at least one processor, on a security-by-security basis over a period of time according to claim 1, further comprising comparing the index value computed from public data against the index value computed from private data and determining if the difference is within a percentage.

9. A method for creating an index value for evaluating market center execution quality, with at least one processor, on a security-by-security basis over a period of time comprising:
   utilizing an execution speed of a preexisting order of covered security orders that were executed at a market center to create a first value from empirical measurements;
   utilizing price improvement of a preexisting order of covered security orders that were executed at a market center to create a second value from empirical measurements;
   utilizing a percentage of covered security orders that were executed at a market center at a quoted value or a better value to create a third value from empirical measurements;
   utilizing a percentage of covered security orders that were executed at outside a quoted value to create a fourth value from empirical measurements;
   utilizing effective spread, which is twice an absolute value of a difference between an execution price for a securities order and a midpoint of a consolidated best bid and offer at a time of a securities order receipt to create a fifth value from empirical measurements;
   summing the first value, the second value, the third value, the fourth value, and the fifth value to create an index value; and
   wherein the utilizing and summing steps are performed by the at least one processor.

10. The method for creating an index value for evaluating market center execution quality, with at least one processor, on a security-by-security basis over a period of time according to claim 9, further comprising normalizing at least one of the first value, the second value, the third value, the fourth value and the fifth value.

11. The method for creating an index value for evaluating market center execution quality, with at least one processor, on a security-by-security basis over a period of time according to claim 9, wherein the index value is computed for at least one marketing center.

12. The method for creating an index value for evaluating market center execution quality, with at least one processor, on a security-by-security basis over a period of time according to claim 9, further comprising providing a warning message when the index value falls below a first level.

13. The method for creating an index value for evaluating market center execution quality, with at least one processor, on a security-by-security basis over a period of time according to claim 10, further comprising providing a warning message, indicating poor securities execution performance, when the index value is less than three hundred (300).

14. The method for creating an index value for evaluating market center execution quality, with at least one processor, on a security-by-security basis over a period of time according to claim 9, further comprising rerouting a securities transaction to another market center when the index value falls below a second level.

15. The method for creating an index value for evaluating market center execution quality, with at least one processor, on a security-by-security basis over a period of time according to claim 10, further comprising rerouting a securities transaction to another market center when the index value is less than two hundred (200).

16. The method for creating an index value for evaluating market center execution quality, with at least one processor, on a security-by-security basis over a period of time according to claim 10, further comprising providing a warning message, indicating poor securities execution performance, when the index value is less than three hundred (300) and rerouting a securities transaction to another market center when the index value is less than two hundred (200).

17. The method for creating an index value for evaluating market center execution quality, with at least one processor, on a security-by-security basis over a period of time according to claim 10, further comprising utilizing a protocol to handle warning messages and rerouting events.

18. A system for creating an index value for evaluating market center execution quality, with at least one processor, on a security-by-security basis over a period of time comprising:
   at least one processor programmed to calculate the following values including a first value that correlates to an execution speed of a preexisting order of covered security orders that were executed at a market center from empirical measurements, a second value that correlates to price improvement of a preexisting order of covered security orders that were executed at a market center with the at least one processor from empirical measurements, a third value that correlates to a percentage of covered security orders that were executed at a market center at a quoted value or a better value from empirical measurements, a fourth value that correlates to a percentage of covered security orders that were executed at outside the quoted value from empirical measurements and a fifth value that correlates to effective spread from empirical measurements, which is twice an absolute value of a difference between an execution price of a securities order and a midpoint of a consolidated best bid and offer at a time of a securities order receipt; and
   at least one processor programmed to sum at least two of the first value, the second value, the third value, the fourth value, and the fifth value to create an index value.

19. The system for creating an index value for evaluating market center execution quality, with at least one processor, on a security-by-security basis over a period of time according to claim 18, wherein the at least one process normalizes at least one of the first value, the second value, the third value, the fourth value and the fifth value.

20. The system for creating an index value for evaluating market center execution quality, with at least one processor, on a security-by-security basis over a period of time according to claim 18, wherein the at least one processor computes an index value for at least one marketing center.

21. The system for creating an index value for evaluating market center execution quality, with at least one processor, on a security-by-security basis over a period of time according to claim 18, wherein the at least one processor computes a first index value for ascertaining when a warning message needs to be conveyed indicating poor securities execution performance.

22. The system for creating an index value for evaluating market center execution quality, with at least one processor, on a security-by-security basis over a period of time according to claim 18, wherein the at least one processor computes a second index value for ascertaining when a securities transaction needs to be rerouted to another market center.

23. The system for creating an index value for evaluating market center execution quality, with at least one processor, on a security-by-security basis over a period of time according to claim 18, wherein the at least one processor computes a first index value for ascertaining when a warning message needs to be conveyed indicating poor securities execution performance and the at least one processor computes a second index value for ascertaining when a securities transaction needs to be rerouted to another market center.

24. The system for creating an index value for evaluating market center execution quality, with at least one processor, on a security-by-security basis over a period of time according to claim 18, wherein the at least one processor operates on a protocol to handle warning messages and rerouting events.

25. The system for creating an index value for evaluating market center execution quality, with at least one processor, on a security-by-security basis over a period of time according to claim 18, wherein the at least one processor creates index value from public data and an index value from private data and determines if the difference is within a percentage.

26. A system for creating an index value for evaluating market center execution quality, with at least one processor, on a security-by-security basis over a period of time comprising:
   at least one processor programmed to calculate and sum a first value that correlates to an execution speed of a preexisting order of covered security orders that were executed at a market center from empirical measurements, a second value that correlates to price improvement of a preexisting order of covered security orders that were executed at a market center from empirical measurements, a third value that correlates to a percentage of covered security orders that were executed at a market center at a quoted value or a better value from empirical measurements, a fourth value that correlates to a percentage of covered security orders that were executed at outside the quoted value from empirical measurements and a fifth value that correlates to an effective spread from empirical measurements, which is twice an absolute value of a difference between an execution price of a securities order and the midpoint of a consolidated best bid and offer at the time of a securities order receipt.

27. The system for creating an index value for evaluating market center execution quality, with at least one processor, on a security-by-security basis over a period of time according to claim 26, wherein the at least one processor normalizes the first value, the second value, the third value, the fourth value and the fifth value.

28. The system for creating an index value for evaluating market center execution quality, with at least one processor, on a security-by-security basis over a period of time according to claim 26, wherein the at least one processor computes at least one of first index value for ascertaining when a warning message needs to be conveyed indicating poor securities execution performance and a second index value for ascertaining when a securities transaction needs to be rerouted to another market center.

29. The system for creating an index value for evaluating market center execution quality, with at least one processor, on a security-by-security basis over a period of time according to claim 27, wherein the at least one processor computes at least one of first index value that is less than three hundred (300) to generate a warning message needs to be conveyed indicating poor securities execution performance and a second index value that is less than two hundred (200) to generate commands to reroute a securities transaction to another market center.

30. The system for creating an index value for evaluating market center execution quality, with at least one processor, on a security-by-security basis over a period of time according to claim 26, wherein the at least one processor operates on a protocol to handle warning messages and rerouting events.

\* \* \* \* \*